United States Patent [19]
Conlon

[11] Patent Number: 5,555,747
[45] Date of Patent: Sep. 17, 1996

[54] CONTROL OF CRYSTAL GROWTH IN WATER PURIFICATION BY DIRECTIONAL FREEZE CRYSTALLIZATION

[75] Inventor: William M. Conlon, Palo Alto, Calif.

[73] Assignee: Polar Spring Corporation, Menlo Park, Calif.

[21] Appl. No.: 281,759

[22] Filed: Jul. 28, 1994

[51] Int. Cl.$^6$ .................................................. B01D 9/04
[52] U.S. Cl. .................................................. 62/532; 62/123
[58] Field of Search ........................................ 62/123, 532

[56] References Cited

U.S. PATENT DOCUMENTS

| | | | |
|---|---|---|---|
| 3,338,065 | 8/1967 | Ashley | 62/123 |
| 3,344,616 | 10/1967 | Owen | 62/58 |
| 4,799,945 | 1/1989 | Chang | 62/532 |
| 4,954,151 | 9/1990 | Chang et al. | 62/532 |
| 5,032,157 | 7/1991 | Ruff | 62/532 |

OTHER PUBLICATIONS

Heist, Freeze Crystallization, 7 May 1979 Esp. pp. 348–350.
Moyers & Roosseau, Crystallization Operations, in Handbook of Separation Proless Tech., 1987, p. 606.
Kuo and Wilcox, Removal of Particles by Solidification 1973, Esp. p. 373, First col.
Burton et al., The Distribution of Solute in Crystals Grown From the Melt, Part I Theoretical, 1953, pp. 1987–1989.
Glen, The Physics of Ice, 1974, Chapter Ten pp. 52–55.
Jellinek, The Ice Interface, in Water and Aqueous Solutions, 1972 pp. 95–96.
Taylor, Ice–Water Partition Coefficient for RDX and TNT, 1989, pp. 5–7.
Gill, Heat Transfer in Crystal Growth Dynamics, 1988, pp. 15–16.

Primary Examiner—Ronald C. Capossela

[57] ABSTRACT

A Directional Freeze Crystallization system employs an indirect contact heat exchanger to freeze a fraction of liquid to be purified. The unfrozen fraction is drained away and the purified frozen fraction is melted. The heat exchanger must be designed in accordance with a Growth Habit Index to achieve efficient separation of contaminants. If gases are dissolved in the liquid, the system must be pressurized.

14 Claims, 5 Drawing Sheets

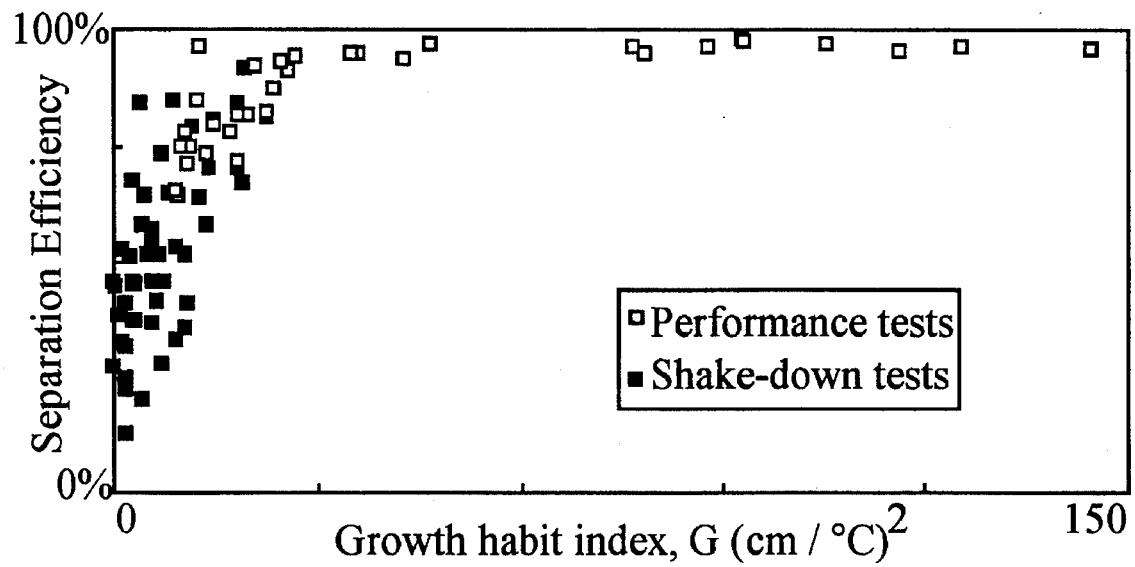
Figure 1
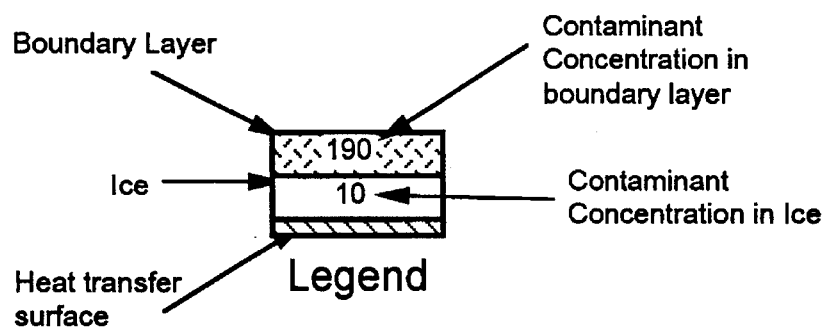
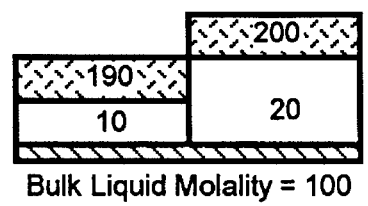
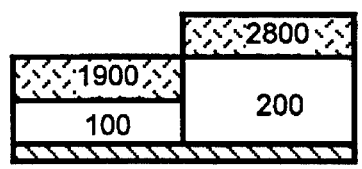
Figure 2a          Figure 2b

CONTROL OF CRYSTAL GROWTH IN WATER PURIFICATION BY DIRECTIONAL FREEZE CRYSTALLIZATION

This invention was made with Government support under contract NAS9-18843 awarded by NASA and contract 68D30135 awarded by EPA. The Government has certain rights in this invention.

FIELD OF THE INVENTION

This invention relates to liquid purification methods and means employing directional freeze crystallization wherein a liquid is partially frozen, the unfrozen liquid fraction is extracted, and the remaining crystalline phase is melted. More particularly, the invention relates to control of crystal growth to reduce entrapment of contaminants within the crystal structure to increase separation efficiency.

BACKGROUND OF THE INVENTION

Freeze crystallization has been used to desalinate seawater, concentrate fruit juices, and separate organic chemicals. According to Heist, up to about 15% of the fluid mass is crystallized in a typical application. A variety of methods have been developed for continuous and batch processes, incorporating different cooling means, means of separation of the crystalline phase from the liquid phase, and melting means. A summary of industrial crystallization practice is provided by Moyers and Rousseau, but only two paragraphs are devoted to batch crystallization out of a sixty-five page article. Batch crystallization techniques for drinking water treatment have been described Chang and Chang et al. in two patents described below.

A batch crystallization apparatus for liquid purification operates in a cycle consisting of the following phases repeated in sequence, as set forth in U.S. Pat. No. 4,799,945, issued Jan. 24, 1989 to Chang:

(a) fill a chamber with the liquid to be purified;

(b) remove heat from the chamber to form frozen liquid of the desired thickness;

(c) drain the unfrozen liquid containing the concentrated impurities from the chamber;

(d) melt the purified frozen liquid and drain it into a storage tank or vessel for use.

Because the solubility of impurities is much higher in the liquid phase than in the solid phase, the impurities become relatively concentrated in the unfrozen liquid and the ice sheet is relatively purified. The frozen liquid can be melted by electric heating, or by applying the heat removed from an opposing out-of-phase chamber.

The capacity of a batch crystallizer is set forth in U.S. Pat. No. 4,954,151, issued Sep. 4, 1990 to Chang, Conlon and Hendricks. The capacity is related to a number of parameters, including the Conversion, defined as the volume ratio of purified liquid to initial liquid. It is generally desirable to maximize the Conversion to minimize both energy consumption and the volume of unfrozen liquid. The latter is particularly important when batch crystallization is used for water treatment in drought prone locations. Chang et al. also described optimal ice thickness so as to minimize the effect of re-contamination of the crystalline phase by an adherent liquid film containing impurities. They also suggested the use of a thin, thermally insulating layer on the heat transfer surface to promote more uniform ice growth by increasing the thermal resistance normal to the heat transfer surface relative to along the heat transfer surface.

The solubility of the dissolved impurities also imposes limits on Conversion. As the impurity concentrations in the liquid phase increase, one or more of the impurities may exceed their solubility limits and precipitate, in the case of dissolved solids, or nucleate a gas bubble, in the case of dissolved gases. Because the concentration is highest in the boundary layer at the ice-water interface, that is where they come out of solution. Waters containing carbonates are particularly prone to have gas bubbles come out of solution, apparently due to carbon dioxide evolution from changes in pH.

Kuo observed that particles tend to settle in the depressions formed around air bubbles, and that when air bubbles break free, momentary rapid freezing occurs. With significant quantities of carbonate ions in the water, however, I have observed the crystalline structure is disrupted, and a opaque matrix of frozen water and bubbles is formed. I believe that the bubbles restrict the liquid flow paths that would otherwise allow the impurities to diffuse away from the ice interface. The removal of air bubbles is important in the production of clear ice by ice making machinery. In the Vogt tube-ice machine, ice grows inwardly from the walls of a tube, and water is circulated within the tube of ice to carry away impurities and air bubbles. In triple-point crystallizers the water is deaerated by the vacuum system, so that bubbles are not a significant problem.

The prior patents teach the importance of optimizing the capacity of the refrigeration system relative to the heat transfer surface area to maximize the quantity of ice produced in a given size apparatus. However, these prior teachings did not recognize the importance of heat transfer uniformity on the quality of the ice produced. I have found that the separation efficiency is determined primarily by the ice crystal growth habit, which is strongly influenced by the degree of uniformity of the heat transfer surface.

According to Glen, common ice crystals are hexagonal and grow either parallel (a-axis) or perpendicular (c-axis) to the plane of the hexagon. Growth is more rapid in the direction of the six a-axes than in the c-direction. According to Jellinek, when ice forms on a heat exchanger surface, as in a DFC system, the ice layer spreads rapidly over the surface, and the morphology and growth rate appear to be influenced by the polar nature of the substrate. Dendritic growth rapidly skins over the surface and then the crystal grows perpendicular to the free surface in columns parallel to the c-axis. Later, some of the crystals are wedged out and the columnar growth continues, but with the c-axis parallel to the ice-water interface. The columnar ice is most likely polycrystalline, with parallel grains growing into the liquid.

As the ice thickens, the concentration of contaminants starts to increase in the boundary layer adjacent to the ice. Since the freezing temperature decreases as the molality of contamination increases, the freezing point is lower in the boundary layer than in the bulk liquid. Ice needles can result from an instability called "constitutional supercooling," when an ice crystal penetrates the boundary layer. The tip of this crystal would be highly supercooled compared to the relatively pure bulk liquid, so it could grow rapidly.

In Directional Freeze Crystallization, cooling :occurs through the ice layer by conduction, so there are both concentration and thermal boundary layers. Beyond the thermal boundary layer the liquid would not be sufficiently supercooled to support the growth of ice needles. This minimizes the likelihood of constitutional supercooling producing ice needles growing perpendicular to the heat transfer surface.

DESCRIPTION OF THE DRAWINGS

FIG. 1 shows a graph relating contaminant separation efficiency to a Growth Habit Index.

FIGS. 2A and 2B show a cross-section of ice and contaminant in a boundary layer, and the effect of bulk liquid molality on freezing point depression.

SUMMARY OF THE INVENTION

Figure 3:
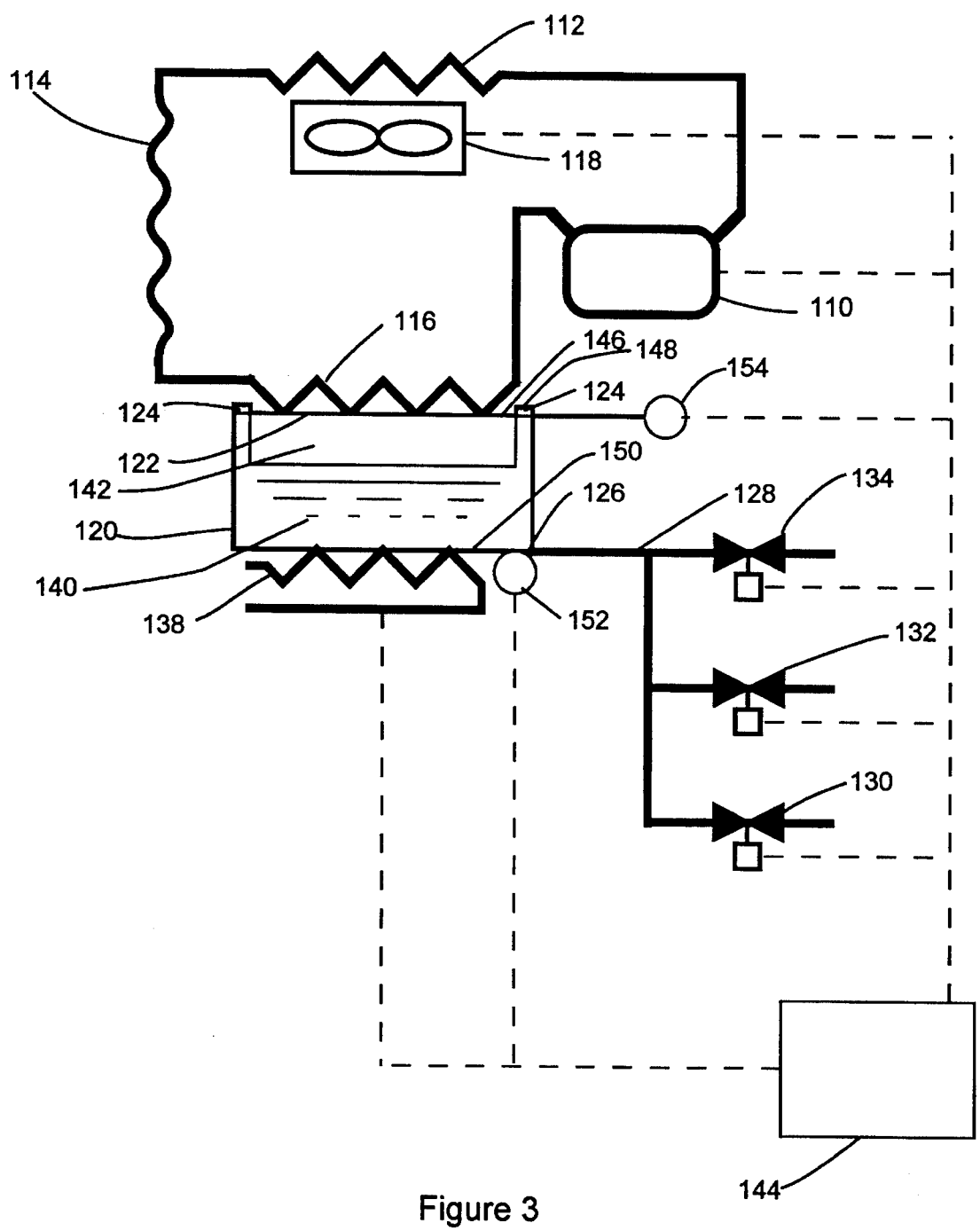
FIG. 3 shows a schematic diagram of a Directionally Freeze Crystallization system employing a horizontally oriented flat freezing surface.

I have found two types of crystal growth habit—normal and parallel to the heat transfer surface. The normal mode of crystal growth exhibits efficient contaminant removal, but the parallel mode is inefficient. I have also found that the growth habit will change from the efficient normal mode to the inefficient parallel mode under certain conditions which are correlated by a Growth Habit Index, G, having units of $(cm^2 C^{-2})$, defined as, $$G=[D] \div [\Delta T_f \cdot dr/dt \cdot dT/dz],$$

where

D is the diffusion coefficient, $cm^2 \ s^{-1}$, of the contaminant;

$\Delta T_f$ is the freezing point depression, °C., of the unfrozen liquid;

dr/dt is the ice growth rate, $cm \ s^{-1}$;

dT/dz is the heat transfer surface temperature gradient, °C. $cm^{-1}$.

This Growth Habit Index includes four important factors that influence separation by Directional Freeze Crystallization. The first, D, is a property of the contaminant, and determines the rate at which impurities diffuse away from the ice front. The second, $\Delta T_f$, is a function of the solution, being determined by the molality of the contaminant. The third, dr/dt, is the rate at which the ice front advances into the bulk liquid and was the subject of the patent by Chang et al., referred to earlier, where the compressor capacity, heat transfer surface area and refrigerant evaporation temperature were optimized. The fourth factor, dT/dz, is a function of the heat exchanger on which the ice is grown. In designing a DFC system, the first two factors are properties of the fluid to be processed, while the latter two are engineering design factors.

I have found that when the Growth Habit Index G is sufficiently large, the ice growth habit was entirely normal to the heat transfer surface, and efficient contaminant separation was achieved (typically more than 95% contaminant removal). When the Growth Habit Index G was relatively small, I always found parallel ice growth with correspondingly low separation efficiencies (typically less than 50%). FIG. 1 shows a range of crystal growth experiments plotted in terms of the Growth Habit Index on the abscissa and the separation efficiency on the ordinate. This shows the transition from the normal ice growth habit to parallel growth occurs for values of G around 20 $cm^2$ °$C^{-2}$.

A possible explanation for the dependence of this growth habit transition on $\Delta T_f$ can be seen by reference to FIG. 2. FIGS. 2a and 2b show ice growth into 100 and 1000 micro molal solutions, respectively, with left and fight icessections. The left hand ice section has grown one boundary layer thickness, while the fight hand section has grown two boundary layer thicknesses, causing a difference in contaminant concentration in the boundary layers next to the two sections. Assuming that 90% of contaminants are rejected from the ice, and neglecting diffusion of contaminants into the bulk liquid, a mass balance shows that the freezing point is lower in the fight hand boundary layer. This freezing point gradient in the boundary layer is believed to instigate the growth of ice ridges parallel to the heat transfer surface. Moreover, the magnitude of the freezing point gradient increases in proportion to bulk liquid molality, which explains the dependence on contaminant concentration.

It is important to understand that the value G is not constant during the batch freeze crystallization process. First, as the ice grows, the contaminant concentration in the unfrozen liquid increases, increasing the freezing point depression $\Delta T_f$ in the bulk liquid and in the boundary layer. Second, the ice growth rate may change, depending on the geometry of the heat exchanger surface. As pointed out by Chang et al., the volumetric ice growth rate (that is, cu.cm. per second) is constant until the ice grows to a critical thickness sufficient to reduce the rate of heat flow below the compressor capacity. This critical ice thickness is fixed by the relation between compressor capacity, heat exchanger surface area and evaporation temperature. However, the linear growth rate of ice into the contaminated water, which is the parameter of interest for the Growth Habit Index, may vary with ice thickness depending on the radius of curvature of the ice.

DESCRIPTION OF THE INVENTION

An embodiment of the inventive system is described with reference to FIG. 3, a schematic flow diagram showing a sectional view of a horizontally oriented flat plate Directional Freeze Crystallization system. A conventional vapor compression refrigeration system is comprised of a Refrigerant vapor compressor 110, Refrigerant condenser 112, Refrigerant expansion device 114, and Refrigerant evaporator 116. A Condenser cooling fan 118 or other suitable means may be employed to reject heat from the system. The Refrigerant evaporator circuit 116 is thermally coupled to the upper side of Freeze plate 122 in a manner chosen to minimize the temperature gradient along said Freeze Plate. Around the periphery of the Freeze plate 122 is an Air space area 148 to which is connected a level sensor 154. A Freeze tray 120 has an inclined Lower inside surface 150 at the lowest point of which a Drain port 126 is connected a Liquid manifold 128. Attached to the Liquid manifold 128 are a Feed valve 130, a Concentrate valve 132, and a Product valve 134. Heating means 138 and Temperature sensor 152 are disposed on the bottom of the Freeze tray 120. Controller 144 Sequences the operation of the Refrigerant vapor compressor 110, Condenser cooling fan 118, Feed valve 130, Concentrate valve 132, Product valve 134, and Heating means 138 in response to signals from Level sensor 154 and Temperature sensor 152. Directional Freeze Crystallization occurs in a batch process comprised of a series of steps. The first step is to open the Feed valve 130 to admit contaminated liquid. When the contaminated liquid is contact with the Freeze Plate 122 as indicated by level sensor 154, the second step begins as the Feed valve 130 is closed and the Refrigerant vapor compressor 110 and Condenser cooling fan 118 are turned on. The third step begins when the desired quantity of Purified ice 142 has formed on Freeze Plate 122, as indicated by Temperature sensor 152, Level sensor 154, or a timer in Controller 144, and the Refrigerant vapor compressor 110 and Condenser cooling fan 118 are turned off, and the Concentrate valve 132 is opened to discard the Concentrated unfrozen liquid 140. After the Concentrated unfrozen liquid 140 has drained, as indicated by a timer in Controller 144, the fourth step begins by turning on the Heating means 138, closing the Concentrate valve 132 and opening the Product valve 134. When all of the Purified ice 142 has melted, as indicated by Temperature Sensor 152 or a timer in Controller 144, the Heating means 138 is turned off, the Product valve 134 is closed, and step 1 is repeated.

Figure 4:
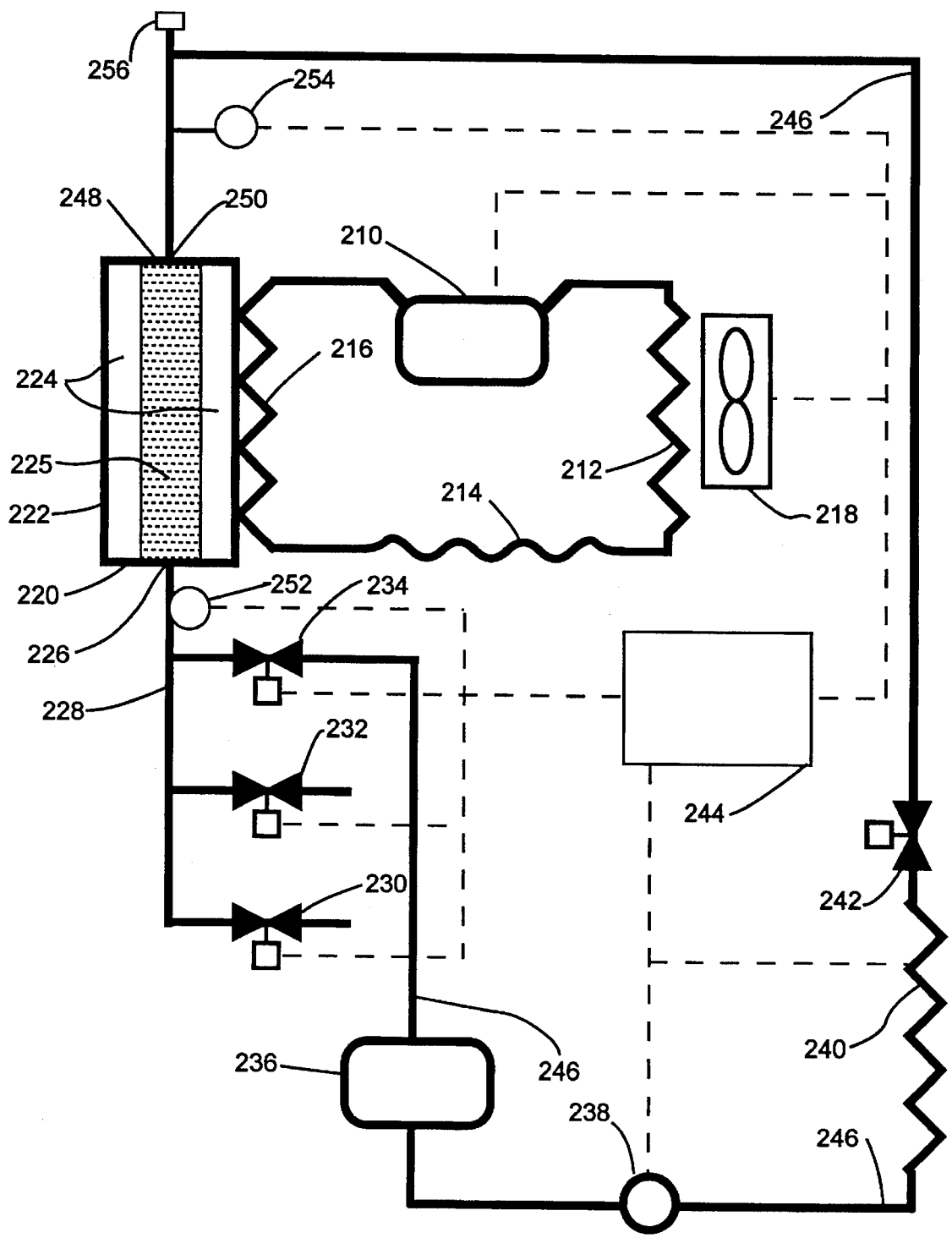
FIG. 4 shows a schematic diagram of a Directional Freeze Crysallization system employing a vertically oriented cylindrical freezing surface with radially inward ice growth.

An alternate embodiment of the inventive System is described with reference to FIG. 4, a schematic flow diagram showing a sectional view of a vertically oriented cylindrical Directional Freeze Crystallization system with ice growing radially inward. A conventional vapor compression refrigeration system is comprised of a Refrigerant vapor compressor 210, Refrigerant condenser 212, Refrigerant expansion device 214, and Refrigerant evaporator 216. A Condenser cooling fan 218 or other suitable means may be employed to reject heat from the system. The Refrigerant evaporator circuit 216 is thermally coupled to the walls of the Cylindrical heat exchanger 222 in a manner chosen to minimize the temperature gradient along said Cylindrical heat exchanger. At the bottom of the Cylindrical heat exchanger 222 is a Lower cap 220 at the center of which a Drain port 226 is connected to a Liquid manifold 228. Attached to the Liquid manifold 228 are a Feed valve 230, a Concentrate valve 232, and a Product valve 234. Connected to the Product valve 230 by Fluid conduit means 246 are storage tank 236, Circulating water pump 238, Heating means 240, and Circulating water valve 242, which is connected by Fluid conduit means 246 to the Upper Port 250 in the Upper cap 248 at the top of the Cylindrical heat exchanger 222. Temperature sensor 252 is disposed on the Liquid manifold 228 and Level sensor 254 is connected by Fluid conduit means 246 to the Upper Port 250. Controller 244 sequences the operation of the Refrigerant vapor compressor 210, Condenser cooling fan 218, Feed valve 230, Concentrate valve 232, Product valve 234, Circulating water pump 238, Circulating water valve 242, and Heating means 240 in response to signals from Level sensor 254 and Temperature sensor 252. Directional Freeze Crystallization occurs in a batch process comprised of a series of steps. The first step is to open the Feed valve 230 to admit contaminated liquid and displace air through the Upper port 250 to the atmosphere through Vent port 256. When the contaminated liquid is contact with the entire surface of Cylindrical heat exchanger 222 as indicated by level sensor 254, the second step begins as the Feed valve 230 is closed and the Refrigerant vapor compressor 210 and Condenser cooling fan 218 are turned on. The third step begins when the desired quantity of Purified ice 224 has formed on Cylindrical heat exchanger 222, as indicated by displacement of water due to volumetric expansion of said Purified ice 224 sensed by Level sensor 254, or a timer in Controller 244, and the Refrigerant vapor compressor 210 and Condenser cooling fan 218 are turned off, and the Concentrate valve 232 is opened to discard the Concentrated unfrozen liquid 225. After the Concentrated unfrozen liquid 225 has drained, as indicated by a timer in Controller 244, the fourth step begins by closing the Concentrate valve 232, opening the Product valve 234 and Circulating water valve 242, and turning on the Circulating water pump 238 and Heating means 240 to circulate previously melted purified water contained in Storage tank 236 over the Purified ice 224. When all of the Purified ice 225 has melted, as indicated by Temperature Sensor 252 or a timer in Controller 244, the Circulating water pump 238 and Heating means 240 are turned off. After an interval of time sufficient to allow melted purified water to drain into the Storage tank 236, the Product valve 234 and Circulating water valve 242 are closed, and step 1 is repeated.

Figure 5:
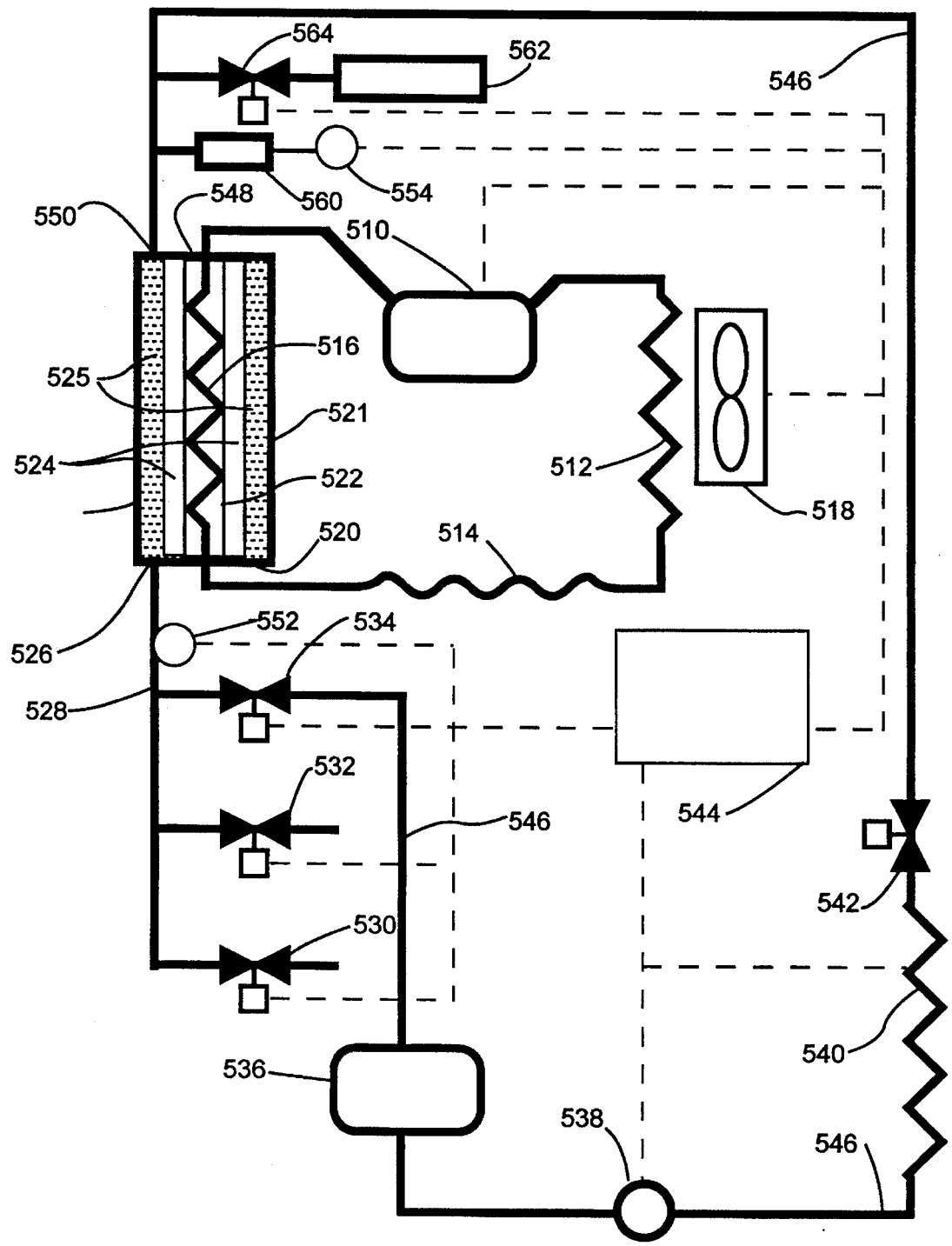
FIG. 5 shows a schematic diagram of a Directional Freeze Crysallization system employing a vertically oriented cylindrical freezing surface with radially outward ice growth.

Another embodiment of the inventive system is described with reference to FIG. 5, a schematic flow diagram showing a sectional view of a vertically oriented cylindrical Directional Freeze Crystallization system with ice growing radially outward. A conventional vapor compression refrigeration system is comprised of a Refrigerant vapor compressor 510, Refrigerant condenser 512, Refrigerant expansion device 514, and Refrigerant evaporator 516. A Condenser cooling fan 518 or other suitable means may be employed to reject heat from the system. The Refrigerant evaporator circuit 516 is thermally coupled to the walls of the Cylindrical heat exchanger 522 in a manner chosen to minimize the temperature gradient along said Cylindrical heat exchanger. The Cylindrical heat exchanger 522 is concentrically mounted in Cylindrical vessel 521 having a Lower cap 520 and an Upper cap, 548. Connected to the Drain port 526 in the Lower cap 520 is a Liquid manifold 528 to which are attached a Feed valve 530, a Concentrate valve 532, and a Product valve 534. Connected to the Product valve 530 by Fluid conduit means 546 are storage tank 536, Circulating water pump 538, Heating means 540, and Circulating water valve 542, which is connected by Fluid conduit means 546 to the Upper Port 550 in the Upper cap 548. Temperature sensor 552 is disposed on the Liquid manifold 528. Pressure sensor 554 is connected to Liquid accumulator 560 which in turn is connected by Fluid conduit means 546 to the Upper Port 550. Air accumulator 562 is connected by Fluid conduit means 546 through Air valve 564 to the Upper Port 550. Controller 544 sequences the operation of the Refrigerant vapor compressor 510, Condenser cooling fan 518, Feed valve 530, Concentrate valve 532, Product valve 534, Circulating water pump 538, Circulating water valve 542, Air valve 564 and Heating means 540 in response to signals from Pressure sensor 554 and Temperature sensor 552. Directional Freeze Crystallization occurs in a batch process comprised of a series of steps. The first step is to open the Feed valve 530 and the Air valve 564 to admit contaminated liquid and displace air through the Upper port 550 to the Air accumulator 562, causing the displaced air to be compressed. When the contaminated liquid is contact with the entire surface of Cylindrical heat exchanger 522 as indicated by Pressure sensor 554, the second step begins as the Feed valve 530 and Air valve 564 are closed and the Refrigerant vapor compressor 510 and Condenser cooling fan 518 are turned on. During the second step Purified ice 524 grows outward from the Cylindrical heat exchanger 522 causing liquid to be displaced into Water accumulator 560. The displacement of water into water accumulator 560 is resisted by resilient bias means, such as a mechanical spring or a trapped volume of air, causing pressure to increase. This increased water pressure serves to keep gas bubbles in solution. The third step begins when the desired quantity of Purified ice 524 has formed, as indicated by Pressure sensor 554 and the Refrigerant vapor compressor 510 and Condenser cooling fan 518 are turned off. The Concentrate valve 532 is opened to allow liquid to drain from Water accumulator 560 and then the Air valve 564 is opened to allow compressed air from Air accumulator 562 to displace the Concentrated unfrozen liquid 525. After the Concentrated unfrozen liquid 525 has drained, as indicated by Pressure sensor 554, the fourth step begins by closing the Concentrate valve 532 and Air valve 564, opening the Product valve 534 and Circulating water valve 542, and turning on the Circulating water pump 538 and Heating means 540. Previously melted purified water contained in Storage tank 536 is heated and circulated through Cylindrical vessel 521 to melt Purified ice 524. When all of the Purified ice 524 has melted, as indicated by Temperature Sensor 552, the Circulating water pump 538 and Heating means 540 are turned off. After an interval of time sufficient to allow melted purified water to drain into the Storage tank 536, the Product valve 534 and Circulating water Valve 542 are closed, and step 1 is repeated.

Figure 6:
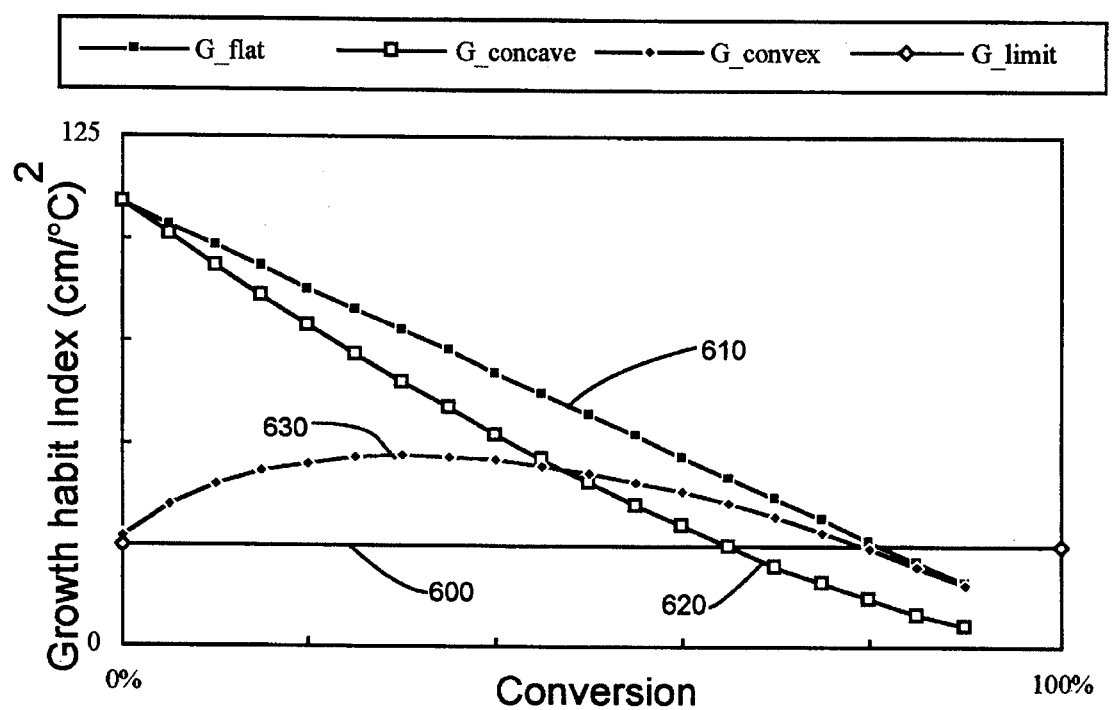
FIG. 6 shows a graph relating the Growth Habit Index to the fraction of liquid that is frozen for different shaped freezing surfaces.

FIG. 6 illustrates the use of the Growth Habit Index in the design of a Directional Freeze Crystallization System. Plotted on FIG. 6 are the calculated Growth Habit indices for three alternate heat exchangers as the ice fraction is increased. Curve 610 shows the Growth Habit Index for the flat plate heat exchanger; curve 620 shows the Growth Habit Index for a cylindrical heat exchanger with ice growing radially inward; and curve 630 shows the Growth Habit Index for a cylindrical heat exchanger with ice growing radially outward. Also shown is curve 600, at a constant Growth Habit Index of 25 $cm^2/C^2$, which might be considered a lower limit to avoid parallel ice growth.

The freezing point depression, $\Delta T_f$, is identical for each heat exchanger, and is only a function of the Conversion fraction. Each Directional Freeze Crystallizer was assumed to be filled initially with an sodium chloride solution, with a diffusion coefficient of $1.5 \times 10^{-5}$ $cm^2/s$. The heat transfer surface temperature gradient was assumed equal for each heat exchanger at 0.05 °C./cm. Accordingly, the growth rate was calculated from the heat removal capacity, which was assumed the same for each heat exchanger. The surface areas of heat exchangers for curves 610 and 620 and 630 were in the proportion 4:4:1.

For radial outward growth, curve 630, the Growth Habit Index is much smaller for low Conversions, increases to a maximum as the ice growth rate slows, and as the radius of curvature of the ice increases, approaches the curve 610 for the flat plate. For radial inward growth, curve 620 always shows a lower Growth Habit than the flat plate heat exchanger curve 610 and, due to the combined effects of higher contaminant concentration and higher ice front velocity, ultimately shows a lower Growth Habit Index than radial outward growth curve 630. Accordingly, it may be desirable to grow crystals radially outward from a cylindrical heat exchanger, so the decreasing ice growth rate compensates for increasing contaminant concentration. Moreover, radial outward growth can be done with one-fourth of the heat transfer surface area required of the other embodiments, resulting in substantial cost savings.

It is important to note that the design engineer can trade-off tighter manufacturing tolerances (that is reduced temperature gradient) for more heat transfer area (that is slower growth rate) to achieve the required Growth Habit Index. To accommodate variations in water quality that might be encountered in different locations, the system can be designed for the worst case water quality (that is, the most contaminated) likely to be encountered. Alternately, the system can be designed for a typical water quality, and the fraction of water frozen can be adjusted in the field, so that $\Delta T_f$ does not become large enough to trigger the growth habit transition.

Therefore the present invention will provide a method and means for efficiently separating contaminants from water. The present invention avoids unfavorable crystal growth habits that trap impurities and reduce separation efficiency. Moreover, the present invention provides means for designing a practical batch freeze crystallization system by specifying the allowable heat transfer surface temperature gradient in terms of the properties of the solute and solvent being treated, and the refrigeration system being used to remove heat from the crystallization system.

SUMMARY OF THE INVENTION

Accordingly, the present invention provides a means of increasing the rejection of impurities from contaminated water by controlling the growth of the crystalline phase.

Another object of the invention is reduce the cost of a Directional Freeze Crystallization system by reducing the amount of heat transfer surface area.

I claim:

1. A Directional Freeze Crystallization System comprising:
   a) a crystallizer means consisting of a heat exchanger,
   b) a vessel for containing liquid to be purified
   c) a cooling means for conveying a heat transfer fluid to said heat exchanger, said heat transfer fluid being at a temperature less than the freezing point of said liquid to be purified
   d) a filling means for conveying said liquid to be purified into said vessel,
   e) a draining means for conveying unfrozen liquid from said vessel,
   f) a heating means for melting ice frozen on said heat exchanger,
   g) a transfer means for conveying melted ice from said vessel
   h) an accumulator connected by a fluid conduit to said vessel,
   i) a quantity sensor to determine the volume of unfrozen liquid in said accumulator
   j) a state sensor to determine the absence of frozen liquid in said vessel
   j) control means for repeatedly sequentially actuating said filling means, cooling means, draining means, heating means and transfer means responsive to said quantity sensor and said state sensor to fill said vessel with liquid to be purified, freeze a fraction of said liquid to be purified adjacent to said heat exchanger, drain the unfrozen fraction of said liquid to be purified, melt the frozen fraction of said liquid to be purified, and convey the melted fraction from said vessel.

2. The Directional Freeze Crystallization system of claim 1 where the heat exchanger is a flat plate that comprises the upper boundary of said vessel.

3. The Directional Freeze Crystallization, system of claim 1 where the heat exchanger is a cylindrical surface that comprises the vertical boundaries of said vessel.

4. The Directional Freeze Crystallization process of claim 1 where the quantity sensor is a pressure sensor.

5. The Directional Freeze Crystallization system of claim 1 where the heat exchanger surface temperature is substantially uniform.

6. The Directional Freeze Crystallization system of claim 1 where the value of the number formed by dividing the diffusion coefficient of the unfrozen liquid by the product of the freezing point depression of the unfrozen liquid and the ice growth rate and the heat exchanger surface temperature gradient is more than 20 cm$^2$/°C.$^2$.

7. The Directional Freeze Crystallization system of claim 1 where the control means is adjustable to vary the unfrozen liquid fraction so the value of the number formed by dividing the diffusion coefficient of the unfrozen liquid by the product of the freezing point depression of the unfrozen liquid and the ice growth rate and the heat exchanger surface temperature gradient is substantially more than 20 cm$^2$/°C.$^2$.

8. The Directional Freeze Crystallization system of claim 1 where the state sensor is a temperature sensor.

9. The Directional Freeze Crystallization system of claim 1 where the heating means is conveyed by circulating purified liquid over the ice.

10. The Directional Freeze Crystallization system of claim 1 where the accumulator is resiliently biased to effect an increase in pressure due to volumetric expansion of ice.

11. A method for liquid purification by Directional Freeze Crystallization comprising the steps:

a) opening a feed valve to admit liquid to be purified into a vessel and into a water accumulator connected to said vessel, and opening an air valve to expel air from said vessel;

b) when the desired volume of said liquid :,to be purified is within said vessel, closing said feed valve and said air valve and supplying cold refrigerant to the coolant side of said heat exchanger;

c) when the desired volume of ice has formed adjacent to said heat exchanger, opening a concentrate valve to drain unfrozen liquid from said water accumulator;

d) after a predetermined time delay, opening said air valve to drain unfrozen liquid from said vessel, and after a second predetermined time delay closing said air valve and said concentrate valve;

e) opening a product valve and a circulating water valve, and starting a circulating pump and a heater to circulate purified liquid from a storage tank through said heater into said vessel to melt the ice;

f) when the ice has melted, turning off the pump and heater to allow melted ice to drain into said storage tank;

g) after a third predetermined time delay, closing said product valve and said circulating water valve.

12. The method of claim 11 where a pressure sensor in communication with the vessel indicates the desired volume of liquid in step b and the desired volume of ice in step c.

13. The method of claim 11 where the air valve is connected to an air accumulator for pressurizing the vessel in step a and to assist in expelling unfrozen liquid from the vessel in step d.

14. The method of claim 11 where a temperature sensor is used in step f to determine that ice has melted.

* * * * *